March 5, 1968  TOMIO YOSHIDA ET AL  3,372,245
ELECTROSTATIC ELECTRO-ACOUSTIC TRANSDUCER
Filed Jan. 20, 1964  10 Sheets-Sheet 3

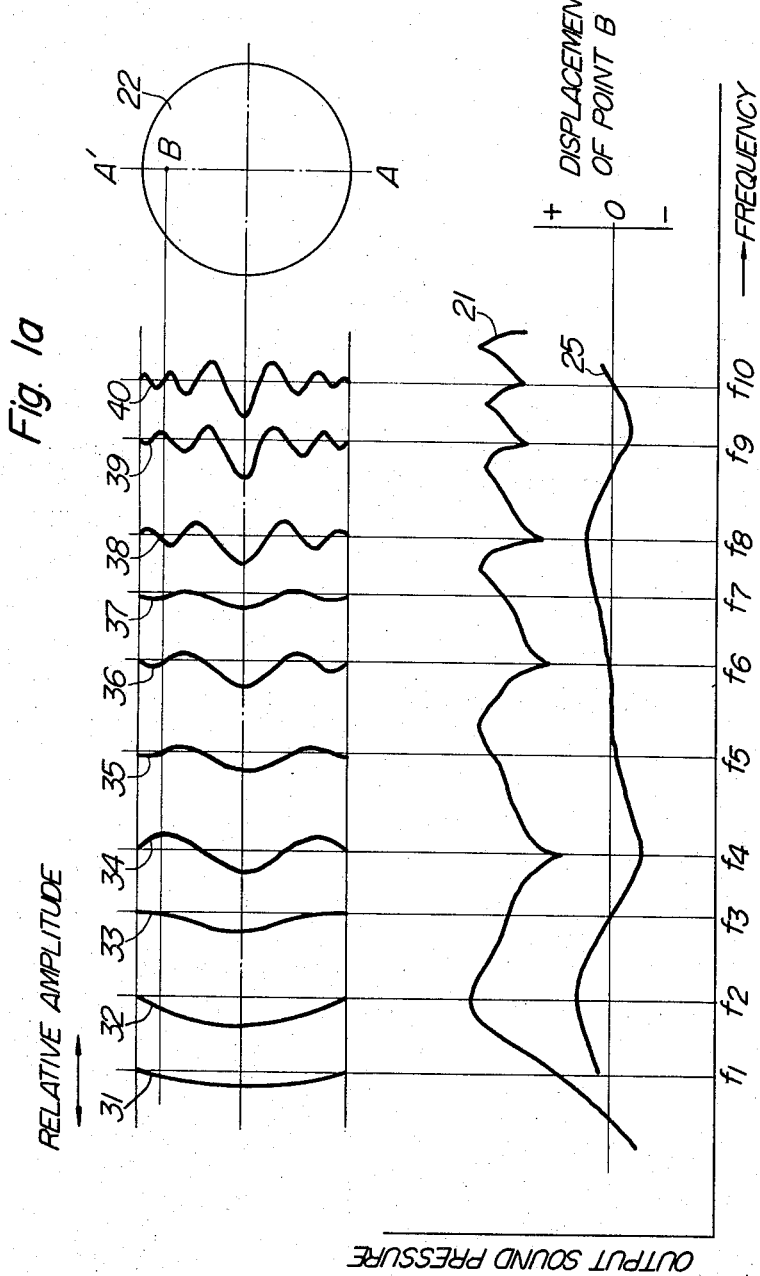

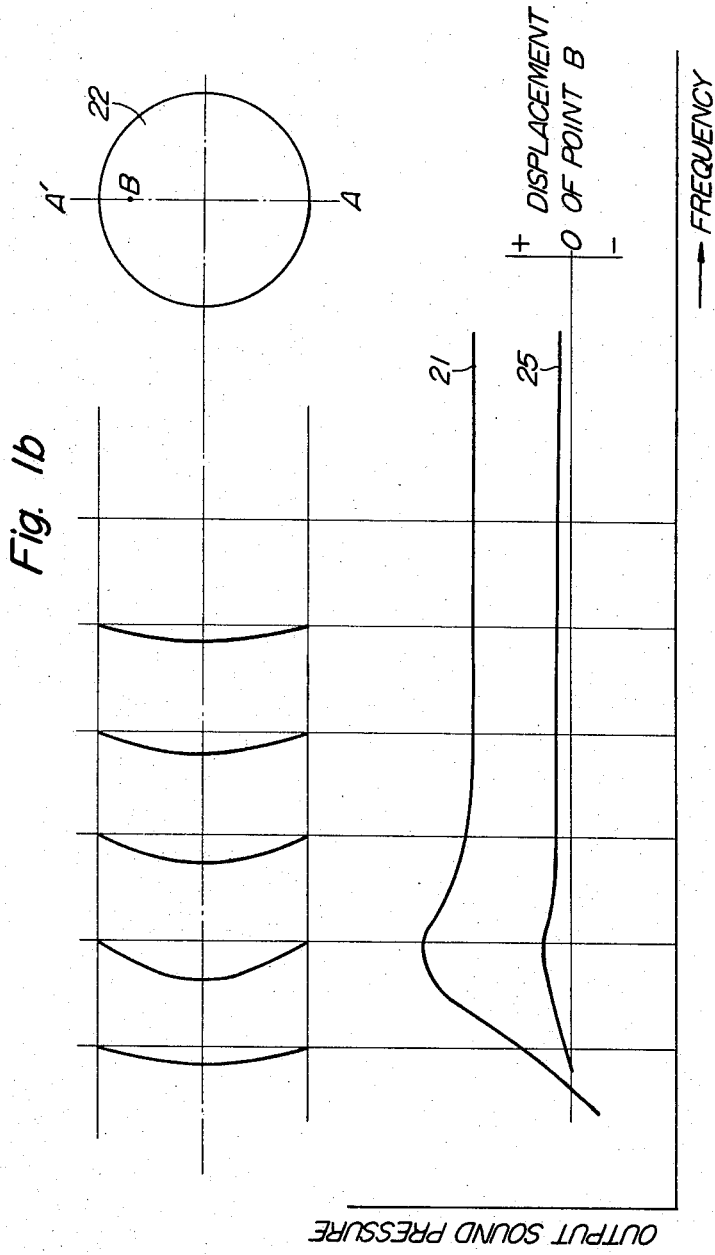

March 5, 1968   TOMIO YOSHIDA ET AL   3,372,245
ELECTROSTATIC ELECTRO-ACOUSTIC TRANSDUCER
Filed Jan. 20, 1964
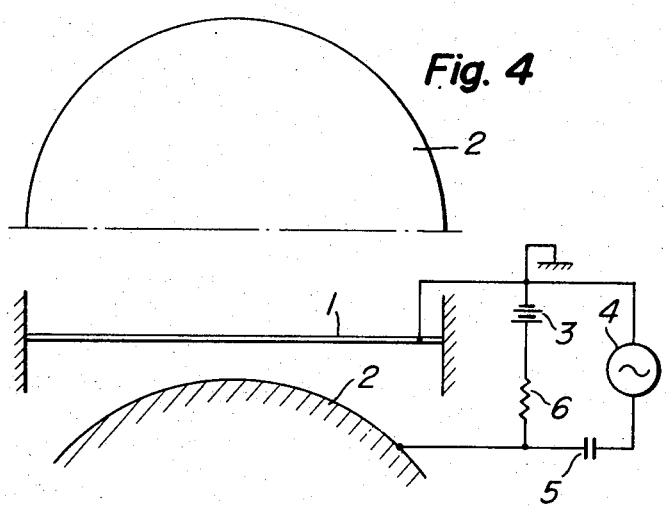
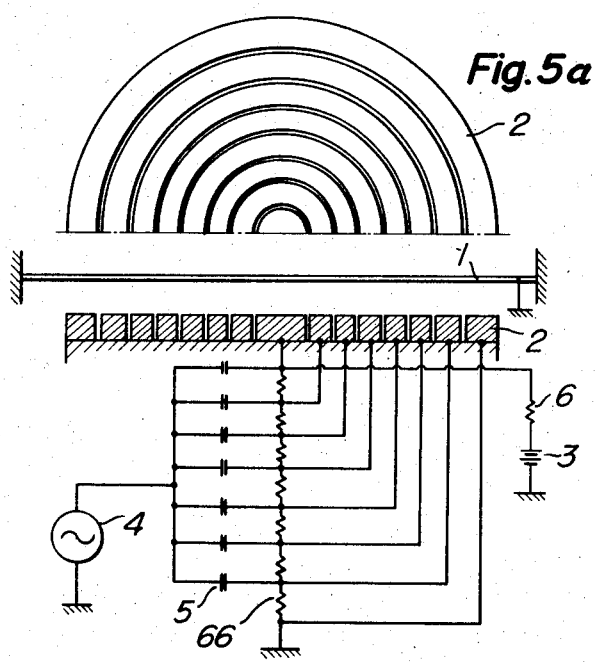
Inventors
Tomio Yoshida
Yasuhiro Riko
By Stevens, Davis, Miller & Mosher
ATTORNEYS United States Patent Office 3,372,245
Patented Mar. 5, 1968

3,372,245
ELECTROSTATIC ELECTRO-ACOUSTIC TRANSDUCER
Tomio Yoshida, Yokohama, and Yasuhiro Riko, Kawasaki-shi, Japan, assignors to Matsushita Electric Industrial Co., Ltd., Osaka, Japan, a corporation of Japan
Filed Jan. 20, 1964, Ser. No. 338,679
Claims priority, application Japan, Jan. 25, 1963, 38/2,687; Oct. 5, 1963, 38/75,582, 38/75,583
9 Claims. (Cl. 179—111)

ABSTRACT OF THE DISCLOSURE

An electrostatic electroacoustic transducer including a novel driving electrode which drives the vibrating member in the manner that the force across the vibrating member is proportional to the free vibrational mode in order for that number to vibrate at a single mode over whole frequency range, the frequency characteristics being further improved by using a novel structure of driving electrode having an auxiliary electrode for motional feedback.

This invention relates to electrostatic electroacoustic transducers, and has for its object to provide an electrostatic electroacoustic transducer having a flattened frequency characteristic over a wide frequency range and having a minimized waveform distortion and to realize by use of such an electroacoustic transducer an electroacoustic device having novel and improved features that could not be realized in the past.

A further object of the present invention is to provide an electrostatic electroacoustic transducer in which means are provided so that vibration of a vibrator is electrically detected and a signal representing the detected quantity is fed back to a driving electrical circuit for thereby establishing a high-fidelity reproduction relationship between an electrical signal input and an acoustic output and flattening the frequency characteristic of the transducer.

Another object of the present invention is to provide an electrostatic electroacoustic transducer suitable for use with a feedback system as described above, that is, a motional feedback system, and at the same time, to provide a motional feedback system having an excellent operating characteristic and finding novel applications by virtue of the use of the electrostatic electroacoustic transducer of the kind described.

The above and other objects, advantages and features of the present invention will become apparent from the following description with reference to the accompanying drawings, in which:

FIG. 1a is a graphic illustration of a manner of variation in the mode of vibration of a stretched circular diaphragm relative to frequencies when a uniform driving force is imparted to the diaphgram according to the prior practice;

FIG. 1b is a graphic illustration of the mode of vibration of the device according to the present invention;

FIG. 3b is a graphic illustration of distribution of the driving force in the embodiment shown in FIG. 3a;

FIG. 4 is a diagrammatic view of another embodiment of the present invention having a circular driving electrode whose electrode gap is varied;

FIG. 5a is a diagrammatic view of still another embodiment of the present invention having a circular driving electrode whose bias voltage is varied;

FIG. 5b is a graphic illustration of distribution of the driving force in the embodiment shown in FIG. 5a;

Figure 2:
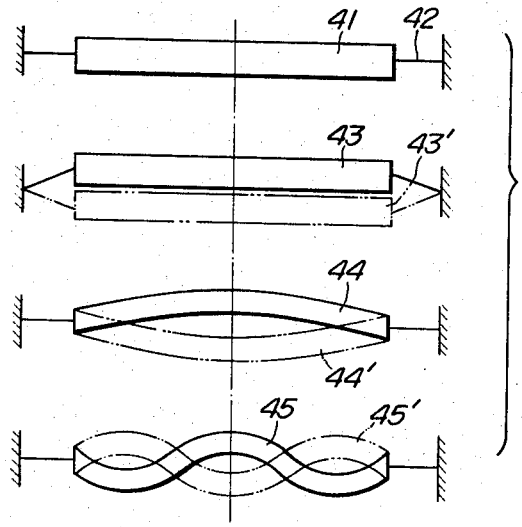
FIG. 2 is a diagrammatic view of means heretofore employed to eliminate the limitation encountered with the prior practice.

The first and fundamental aspect of the present invention resides in improvements of defects encountered with prior electrostatic electroacoustic transducers.

Prior electroacoustic transducers have had a serious defect common to all of their types including the electrostatic type, electromotive type and electromagnetic type. The above defect has resulted from the fact that, in driving a vibrating member by means of an electrical signal, the driven point on the vibrating member is selected paying no attention to the vibration characteristic peculiar to the particular vibrating member. For example, according to prior practice, the driving force is concentrated to the center of or a concentric circle on the vibrating member in case of the electromotive type, or the driving force is uniformly imparted to the entire surface of the vibrating member in case of the electrostatic type. Due to the above manner of driving force impartation, a vibrational mode peculiar to the particular vibrating member appears in response to the frequency of the driving force. Since the above vibrational mode varies depending on the frequency, a high degree of irregularity has been developed in the frequency characteristic of the elastroacoustic conversion characteristics and a very complex relationship appears between vibration at one point on the vibrating member and the electroacoustic conversion characteristics. Due also to the fact that such relationship varies depending on the frequency, the prior electroacoustic transducers have been mostly impractical when used with a motional feedback system because of the limited frequency range and other drawbacks.

A practical example of the prior defect will be described with reference to FIG. 1a showing a manner of variation of the vibrational mode of a stretched circular diaphragm 22 relative to frequencies when a uniform driving force is imparted to the diaphgram. In FIG. 1a, a curve 21 represents the frequency characteristic of relative sound pressure at the front face of the diaphragm 22 when the diaphragm 22 is driven in the state of uniform driving force distribution. Curves 31, 32, . . . , 40 represent the distribution of the displacement of the diaphragm 22 taken on the line A-A' when the diaphragm 22 is driven by the driving force. In other words, these curves 31, 32, . . . , 40 show the distribution of vibrational displacement ranging from the center to the peripheral edges of the diaphragm 22, and correspond to respective frequencies $f_1$, $f_2 \ldots, f_{10}$. Needless to say these curves represent sinuosoidal waves which vary with time and have the respective frequencies $f_1, f_2, \ldots, f_{10}$, and their maxima are represented by 31, 32, ..., 40 as in the conventional manner.

It will be understood that, according to the prior method of driving the diaphragm by a uniformly distributed driving force as has been conventionally practiced in an electrostatic speaker, the vibrational mode varies depending on the frequency, resulting in an extremely irregular unevenness in the frequency characteristic of the speaker. In addition to the above, the output sound pressure is proportional to the frequency only in a limited range of extremely low frequencies as will be apparent from a curve 25 representing the frequency characteristic of displacement of a point B in FIG. 1a. Therefore, any possibility of improvements in the characteristics of an electroacoustic conversion system by detecting a displacement of a point on the vibrating member and thereby forming a motional feedback system has been solely limited to a frequency range of extremely low frequencies.

FIG. 2 shows one of means formerly employed in an effort to eliminate such a limitation. In FIG. 2, reference numerals 41 and 42 designate a rigid vibrating member forming the central portion of the diaphragm, and a soft flange forming the peripheral portion of the diaphragm, respectively. Numerals 43 and 43' show the mode of vibration at a low frequency, 44 and 44' show the mode of vibration at a certain high frequency, and 45 and 45' show the mode of vibration at a further higher frequency. The vibrating member as described above is used in a modified form in a transducer such as, for example, an electromotive speaker. The frequency range in which the diaphragm makes the so-called piston movement as shown by 43, 43' in FIG. 2 is less than 1000 cycles per second in case of the electromotive speaker, and the diaphragm makes vibration with the vibrational mode of higher order as shown by 44, 44' or 45, 45' at frequencies higher than that described above. In order to widen the frequency range in which the diaphragm makes the vibration as shown by 43, 43', it is necessary to make the central vibrating member 41 as rigid as possible. This requirement, however, results in an increased weight which gives rise to reduction of the electroacoustic conversion efficiency. Therefore, in the electroacoustic transducer employing the vibrating member of the above-described type, the extent of the motional feedback system has been determined depending on a requirement in which the efficiency must be increased at the sacrifice of the frequency range or a requirement in which the frequency range is widened at the sacrifice of the efficiency. For example, U.S. Patent No. 2,948,778 or U.S. Patent No. 2,968,695 could not overcome the above-described defect. In other words, these patents could not overcome the defect that the frequency range in which the electrical signal obtained by detecting the vibration of a vibrating member is proportional to the electroacoustically converted output, that is, the frequency range in which the output sound pressure relative to an electrical signal supply is proportional to the detected signal of vibration is limited to extremely low frequencies due to the variation in vibrational mode depending on the frequency. In this respect, it is self-evident that the motional feedback is of significance only in the above-specified frequency range.

The impracticality of applying motional feedback to prior conventional electroacoustic transducers will now be described. The method and functional effect disclosed in U.S. Patent No. 2,948,778 or U.S. Patent No. 2,968,695 can be realized only in a low frequency range in which the vibrational mode, that is, the relative ratio of vibratory displacement at various parts of a vibrating member does not vary even with a variation in the frequency. Indeed, with the prior electroacoustic transducers, the above frequency range has mostly been limited to a value of less than 1000 cycles per second in case of loud speakers and to a value of less than 3000 cycles per second even in case of measuring instruments. At frequencies higher than the above limit, there is no proportionality relation between a detected signal of vibration and an input drive signal or an output acoustic signal due to the fact that the vibrational mode varies depending on the frequency as described previously. Since further these signals have a very complex relationship therebetween in respect of their absolute values and phases which vary depending on the frequency, the transducer cannot find any utility because it develops oscillation or an irregular frequency characteristic when motional feedback is applied thereto. This is quite different from the negative feedback employed in amplifiers. In the case of an amplifier, an increase in its input at a certain frequency causes a corresponding increase in its output regardless of any irregularity in its frequency characteristic. It is therefore possible to widen the feedback frequency range to some extent by applying suitable phase compensation to the amplifier. The above difference between an electroacoustic transducer and an amplifier results from the fact that, in case of the electroacoustic transducer, its input is a one-dimensional voltage or current while its output is three-dimensional, that is, a vibration of a plane having a certain area, whereas in case of the amplifier, its input is a one-dimensional voltage or current and its output is also a one-dimensional voltage or current. Accordingly, in order that the similar way of thinking employed for the amplifier can be strictly applied to the prior electroacoustic transducer, a number of driving force imparting means and vibration detecting terminals corresponding to numerous points on the surface of a vibrating member must be provided and independently arranged so that each has a feedback system similar to that employed for the amplifier, which is quite impractical.

The present invention includes the provision of an electrostatic electroacoustic transducer which is free from the above limitation in the frequency range as well as in the amount of feedback, or more basically the limitation which is inevitably applied to the motional feedback system due to a change in the vibrational mode resulting from a change in the frequency.

The driving force imparted to the vibrating member in the invention is distributed in a manner entirely different from the prior art. In the present invention, it is intended to cause the vibrating member to vibrate in its natural vibrational mode over a wide frequency range by distributing the driving force in a manner to coincide with the natural vibrational mode possessed by the vibrating member. The present invention is limited to an electrostatic type of transducer because with other types of transducers it is difficult to freely distribute the driving force in view of an interrelation with a magnetic circuit and the like.

Suppose now that the driving force imparted to a vibrating member can be distributed at will by a method which will be described later. Then, the vibrating member will vibrate in a single vibrational mode over an entire frequency range according to the below-mentioned principle and it is possible to eliminate various previously described limitations encountered with the transducers used with the motional feedback system. More precisely, vibrating members have their own free vibrational frequencies and free vibrational modes which generally exist in an infinitely great number. As a simple example, consider a circular homogeneous diaphragm stretched by a uniform tension. This stretched circular diaphragm has natural frequencies given by $$f = \frac{a_m}{2\varpi a}\sqrt{\frac{T}{\sigma}} \qquad (1)$$

where $\varpi$ is 3.141592..., T is the tension per unit length, $\sigma$ is the surface density of the diaphragm, $a$ is the radius of the diaphragm, and $a_m$ is the root of the first-kind zero-order Bessel function $J_0(x)=0$ and has an infinitely many number of values such as $a_m=2.4048\ldots, 5.52\ldots,\ldots$. Further, the free vibrational mode corresponding to the above free vibrational frequency is given by $$\xi(r)=A\cdot J_o\left(\frac{a_m}{a}\cdot r\right) \quad (2)$$

where, $\xi(r)$ is a displacement at a position spaced $r$ from the center, and $A$ is a constant which is determined depending on the magnitude of the driving force.

When it is desired to cause vibration of the diaphragm in its first free vibrational mode, that is, the vibrational mode $$\xi(r)=A\cdot J_o=\left(\frac{2.405}{a}\cdot r\right) \quad (3)$$

which gives the equal phase over the entire surface of the diaphragm and the zero amplitude at the peripheral edge of the diphragm, a driving force which is distributed in a form proportional to the above, that is, a driving force given by the following formula may be employed:

$$F(r)=BJ_o\left(\frac{2.405}{a}r\right) \quad (4)$$

where, $F(r)$ is a driving force at a point spaced $r$ from the center, and $B$ is a constant which determines the magnitude of the overall driving force. By distributing the driving force in the above manner, the circular diaphragm vibrates in the vibrational mode given by the Formula 3. This is apparent from the fact that those having different order $m$ in the Formula 2 are orthogonal to each other.

The present invention is based on the principle as described above and gives a solution as to how the driving force distribution expressed by the Formula 4 can be realized.

As is commonly known, an electrostatic force $f$ developed between two parallel flat plates is given by $$f=\frac{\epsilon_o SE^2}{d^2} \quad (5)$$

where, $E$ is a potential difference between the electrodes, $d$ is a spacing between the electrodes, $S$ is the area of the electrode, and $\epsilon_o$ is the dielectric constant of air. In an electrostatic electroacoustic transducer, the electrostatic force $f$ is given by the following formula when a D.C. biasing voltage $E_o$ and a signal voltage $e$ are given:

$$f\frac{\epsilon_o SE_o^2}{d^2}\left[1+\frac{e}{E_o}+\left(\frac{e}{E_o}\right)2\right] \quad (6)$$

Suppose now that $E_o\gg e$, then the electrostatic force $f$ is approximately given by $$f=\frac{\epsilon_o SE_o^2}{d^2}+\frac{\epsilon_o SE_o}{d^2}\cdot e \quad (7)$$

The second term of the right hand member in the Formula 7 represents the driving force which contributes to the electroacoustic conversion.

According to the present invention, the driving force is expressed as $$F(r)=\frac{\epsilon_o(r)S(r)}{d(r)^2}\cdot E_o(r)\cdot e(r) \quad (8)$$

in view of the Formula 7, and the constants $\epsilon_o(r)$, $S(r)$, $E_o(r)$, $e(r)$ and $d(r)$ which contribute to the electroacoustic conversion are varied as functions of the radius $r$ in order to finally establish the respective values of $\epsilon_o(r)$, $S(r)$, $E_o(r)$, $e(r)$ and $d(r)$ so that they satisfy the following equation:

$$F(r)=BJ_o\left(\frac{2.405}{a}r\right)=\frac{\epsilon_o(r)S(r)E_o(r)}{d(r)^2}\cdot e(r) \quad (9)$$

Figure 3B:
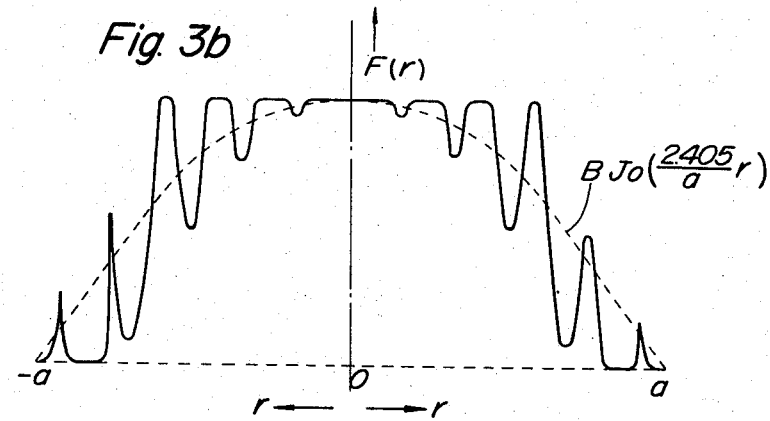
Figure 3A:
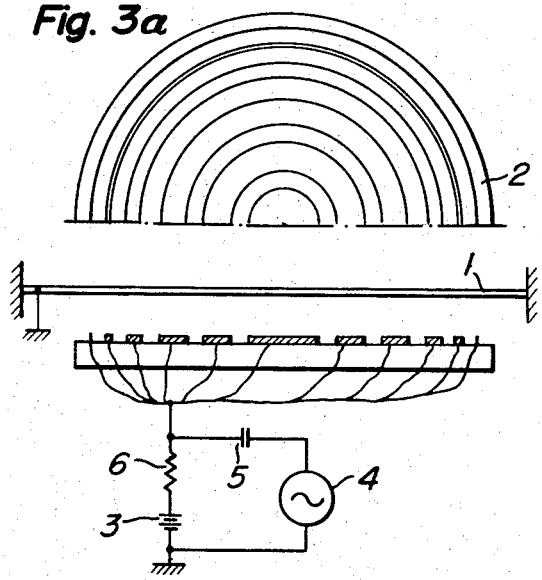
FIG. 3a is a diagrammatic view of an embodiment of the present invention having a circular driving electrode whose effective area is varied.

The method employed for the attainment of the above purpose will be described with reference to the drawings. In FIG. 3A, the driving force is made to coincide with the free vibrational mode by making the above constant $S(r)$ proportional to $$J_o\left(\frac{2.405}{a}r\right)$$

and by setting the constants $\epsilon_o(r)$, $E_o(r)$, $e(r)$ and $d(r)$ at fixed values. In FIG. 3a, the transducer is diagrammatically shown as having a vibrating member or diaphragm 1 and a driving electrode assembly 2. Black portions of the driving electrode assembly 2 have electrical conductivity and thus effectively generate the driving force, while the white portion is an electrical insulator which does not make any electrode action. The black portions consist of concentrically arranged conductors such as metal plates and they have different widths which are determined according to the above function. The driving force distribution in this case is shown in FIG. 3b.

FIG. 4 represents a case in which $d(r)$ is similarly varied, and FIG. 5a represents a case in which $E_o(r)$ is similarly varied by means of resistances 66. FIG. 6 represents a case in which $\epsilon_o(r)$ is similarly varied. In FIGS. 3a to 6, reference numerals 1, 2, 3, 4, 5 and 6 designate a vibrating member or diaphragm, a driving electrode assembly, a D.C. power supply for supplying biasing voltage $E_o$, a source of signal voltage, a D.C. blocking condenser, and an A.C. blocking resistance, respectively.

In the foregoing, description has been given with regard to the method of freely distributing the driving force and proportionating the driving force to the free vibrational mode possessed by a vibrating member.

Figure 5B:
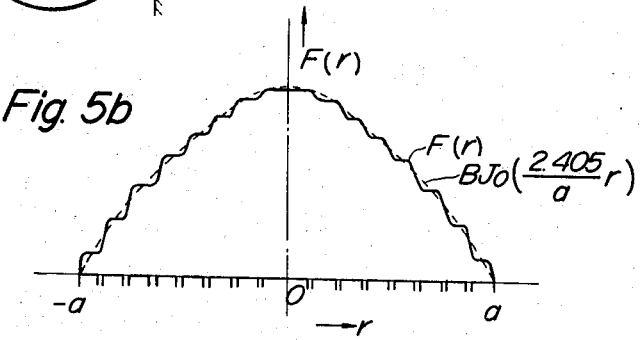
Figure 6:
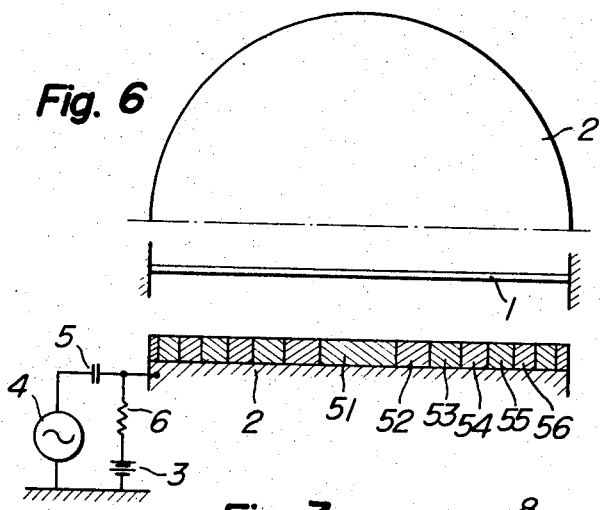
FIG. 6 is a diagrammatic view of a further embodiment of the present invention having a circular driving electrode in which its dielectric constant is varied.
Figure 7:
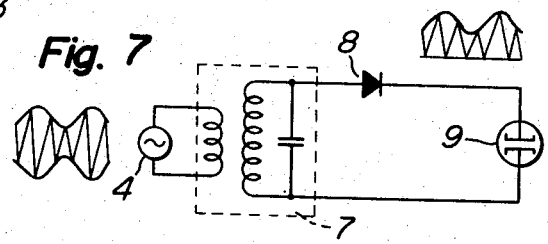
FIGS. 7 to 9 are diagrammatic views of other embodiments of the present invention which are not provided with a source of D.C. biasing voltage.
Figure 8:
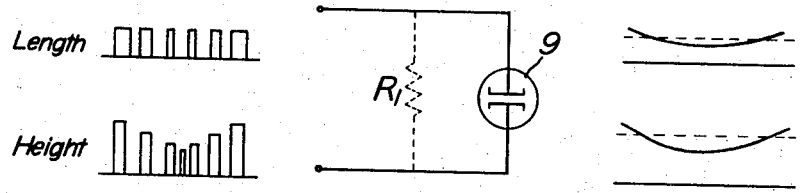
Figure 9:
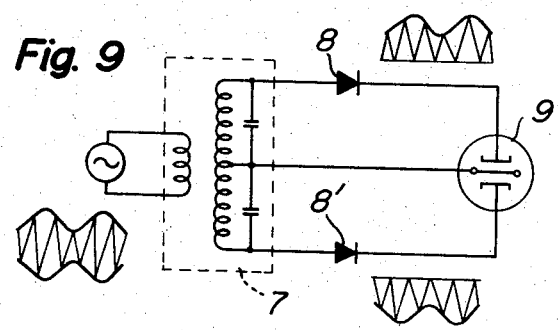

FIG. 5b shows a driving force distribution obtained with the transducer shown in FIG. 5a. In the transducer shown in FIG. 5a, its electrode assembly consists of concentric conductors so that the D.C. biasing voltage applied thereto can be varied from conductor to conductor. In this case, the driving force distribution shows better approximation to the free vibrational mode as the number of divided conductors is increased, and thus the frequency range in which the vibrating member vibrates in a single vibrational mode can be widened. In an experiment in which a uniform driving force was applied to the surface of a circular diaphragm of a metalized polyester film having a radius of 10 cm. and a thickness of $50\mu$ it was ascertained that the diaphragm vibrated in a single vibrational mode in a frequency range up to 2,300 cycles per second when the electrode was split into two concentric sections and the voltage is applied in a ratio of 1:0.4 and in a frequency range up to 4,700 cycles per second when the electrode was split into three concentric sections, whereas the vibrating member in its non-split form only vibrated in a single vibrational mode in a frequency range up to 680 cycles per second. FIG. 1b shows the vibrational mode of the electroacoustic transducer realized in the above manner and is similar to FIG. 1a in its manner of expression.

A driving electrode which is split into a plurality of sections has heretofore been disclosed, for example, in British Patent No. 537,931, but this prior arrangement is entirely different from the present invention in its principle, purpose, structure and effect in that, in the prior arrangement, the voltage distribution ratio is varied depending on a frequency and the entire surface of a vibrating member is driven in a low frequency range, while only the central portion of the vibrating member is driven in a high frequency range. Thus, the prior art device is entirely different from the present invention in which the same driving force distribution is employed in the entire operating frequency range to thereby obtain the same vibrational mode throughout the above range.

In the electrostatic electroacoustic transducer obtained in accordance with the present invention, the input voltage and the output or reproduced sound pressure have a proportionality relation at any portion of the surface of the vibrating member. Therefore, the transducer has a flat frequency characteristic in itself and is very useful as an electroacoustic transducer preferably used with motional feedback.

Figure 16:
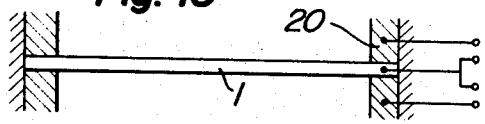
FIG. 16 is a diagrammatic view showing the method of detecting vibration using a piezoelectric material.
Figure 12:
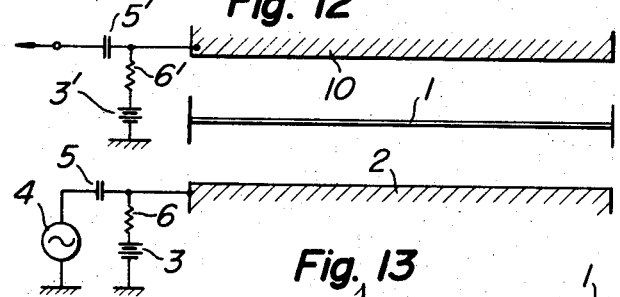
FIGS. 12 and 13 are diagrammatic views of other embodiments having auxiliary electrodes for the detection of vibrational displacement.
Figure 13:
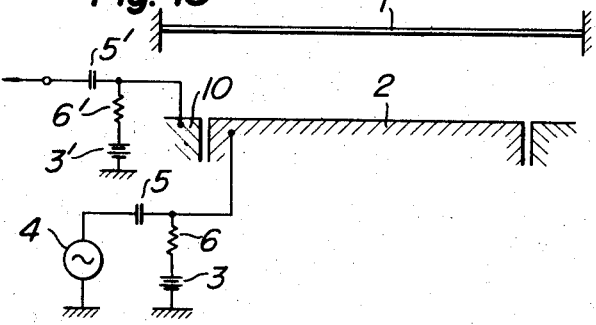
Figure 14:
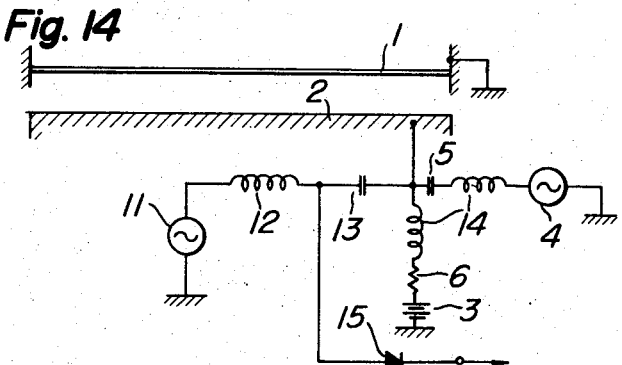
FIGS. 14 and 15 are diagrammatic views showing the method of detecting vibration by utilizing modulation of a high frequency.
Figure 15:
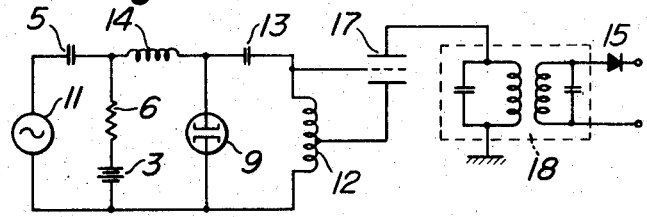

In accordance with the principle of the present invention and the method employed therein, the peripheral portion of the vibrating member or diaphragm can be utilized for vibration detection because no driving force is required to be applied to such portion. Some embodiments of the method of vibration detection according to the invention are illustrated in FIGS. 13 and 16. In FIG. 13, numerals 1 to 6 denote like parts appearing in FIGS. 3a to 6. A reference numeral 10 in FIG. 13 designates an auxiliary electrode for vibration detection, and a D.C. power supply 3', a D.C. blocking condenser 5' and an A.C. blocking resistance 6' are provided for the vibration detection. In FIG. 16, a diaphragm 1 is clamped by a piece 20 of rigid piezoelectric material. Vibration of the diaphragm 1 imparts a force to the piezoelectric element 20 and a voltage thereby generated can be utilized for the detection of vibration of the diaphragm 1.

Figure 17:
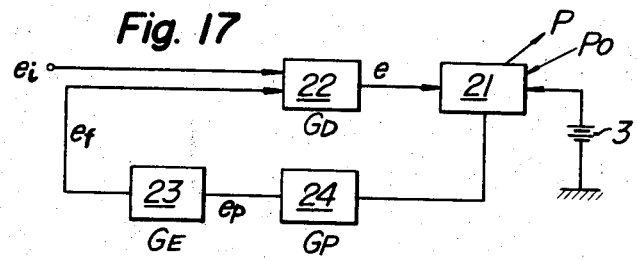
FIG. 17 is a block diagram of a circuit provided with a motional feedback system.

By use of such electroacoustic transducer in a motional feedback system, an arrangemnet as shown in FIG. 17 which is satisfactorily usable over a wide frequency range can be obtained.

$$P = C_0 j\omega \frac{1}{Z_M}\left\{ BG_D \frac{1}{1+\frac{1}{Z_M}G_E G_P G_D B}\left(e_i - \frac{1}{Z_M}G_E G_P P_0 S\right) + P_0 S \right\} \quad (11)$$

Figure 10:
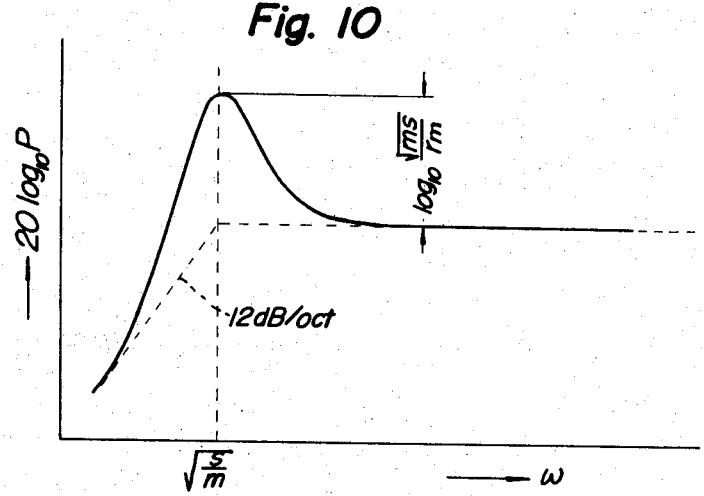
FIGS. 10 and 11 show the frequency characteristics of reproduced sound pressure on the axis perpendicular to a vibrating member having the vibrational mode stabilized according to the teaching of the present invention.
Figure 11:
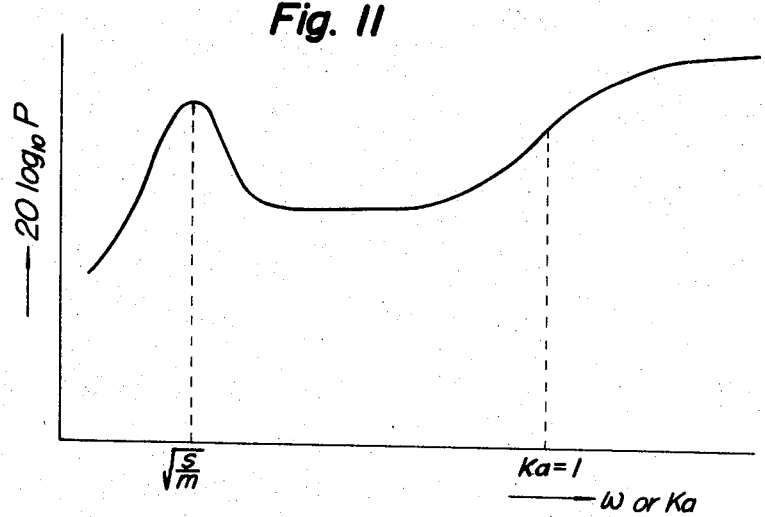

Assuming that $P_O$ is the sound pressure produced on the surface of the vibrating member of the transducer 21 by virtue of the incoming sound from the outside, S the area of the vibrating member, $Z_M$ the mechanical impedance (as hereinbefore mentioned, the characteristics over the whole frequency range are as shown in FIG. 10, and assuming it as a single resonant system, $$Z_M = r_m + j\omega m + \frac{s}{j\omega}$$

wherein $r_m$ is the equivalent mechanical resistance of the vibrating member and $j=\sqrt{-1}$), $e$ the output voltage of driving amplifier 22, $G_D$ its gain, $e_i$ the input electric signal, $G_P$ the sensitivity of vibration detecting device 24, $e_p$ its output voltage (if the vibrating velocity of the vibrating member is $A_O$, $e_P=G_P A_O$), $G_E$ the gain of feed-back equalizer 23, $e_f$ its output voltage, P the sound pressure on the axis perpendicular to the vibrating member ($P=C_O T$, where $T=j\omega A_O$, $C_O=a$ constant) and B the force factor of electro-mechanical transducing, the following equations are established:

The force acting on the vibrating member is the sum of the electric driving force, i.e. the product $Be$ of force factor B and driving voltage $e$, and driving force $P_O S$ due to external sound pressure, $$Be + P_O S \quad (1)$$

Consequently, the vibrating velocity $A_O$ is $$A_O = \frac{1}{Z_M}(Be + P_O S) \quad (2)$$

Voltage $e_p$ is detected thereby, thus $$e_p = G_P A_O = G_P \frac{1}{Z_M}(Be + P_O S) \quad (3)$$

The output voltage $e_f$ of feed-back equalizer 23, whose gain is $G_E$, is $$e_f = G_E G_P \frac{1}{Z_M}(Be + P_O S) \quad (4)$$

Consequently, the input voltage of driving amplifier 22 is $$e_i - e_f = e_i - G_E G_P \frac{1}{Z_M}(Be + P_O S) \quad (5)$$

On the other hand, the output voltage $e$ is $$e = G_D(e_i - e_f) \quad (6)$$

Consequently, from Equation 5

$$e_i - e_f = e_i - G_E G_P \frac{1}{Z_M}\{BG_D(e_i - e_f) + P_O S\} \quad (7)$$

$$\therefore (e_i - e_f)\left(1 + \frac{1}{Z_M}G_E G_P G_D B\right) = e_i - \frac{1}{Z_M}G_E G_P P_O S \quad (8)$$

$$\therefore e_i - e_f = \frac{1}{1 + \frac{1}{Z_M}G_E G_P G_D B}\left(e_i - \frac{1}{Z_M}G_E G_P P_O S\right) \quad (9)$$

Therefore, vibrating velocity $A_O$ is $$A_O = \frac{1}{Z_M}(Be + P_O S) = \frac{1}{Z_M}\{BG_D(e_i - e_f) + P_O S\}$$

$$= \frac{1}{Z_M}\left\{ BG_D \frac{1}{1+\frac{1}{Z_M}G_E G_P G_D B}\left(e_i - \frac{1}{Z_M}G_E G_P P_O S +\right) P_O S \right\} \quad (10)$$

from Eq. 3. Sound pressure P on the axis is

Consequently, the operation of this system is as mentioned below.

(i) Case of $P_O=0$ (incoming sound pressure from outside is zero)

It operates as a conventional speaker, and when $G_E G_P G_D B \gg Z_M$, the externally radiated sound pressure $P_1$ is $$P_1 = j\omega C_0 \frac{1}{Z_M} BG_D \frac{e_i}{\frac{1}{Z_M}G_E G_P G_D B}$$

$$= j\omega C_0 \frac{1}{G_E G_P} e_i \quad (12)$$

Therefore, if $G_E \propto j\omega$, or if feed-back equalizer 23 is a differential amplifier, $P_1$ can be constant irrespective of frequency. In other words, $P_1$ is constant, if the feed back is proportional to the acceleration of vibration.

If $G_E G_P G_D B \gg Z_M$ is not established, the externally radiated sound pressure $P_2$ is $$P_2 = j\omega C_0 \frac{1}{Z_M} BG_P \frac{1}{1+\frac{1}{Z_M}G_E G_P G_D B} e_i$$

$$= j\omega C_0 BG_P \frac{e_i}{Z_M + G_E G_P G_D B} \quad (13)$$

$G_P$, $C_O$, B, and $G_D$ being constants, if in Equation 13

$$C_O BG_D = K_1, \quad G_P G_D B = K_2$$

then $$P_2 = j\omega K_1 \frac{1}{Z_M + G_E K_2} e_i \quad (14)$$

and if $$Z_M = r_m + j\omega m + \frac{s}{j\omega}$$

is substituted, then $$P_2 = j\omega K_1 \frac{1}{r_m + j\omega m + \frac{s}{j\omega} + G_E K_2} e_i \quad (15)$$

Figure 18:
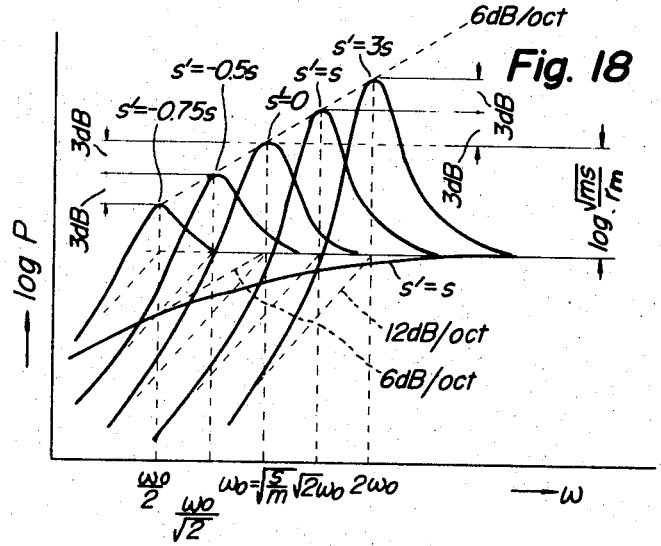
FIGS. 18 to 20 show frequency characteristic curves of the reproduced sound pressure on the axis perpendicular to the vibrating member in the arrangement shown in FIG. 17.
Figure 19:
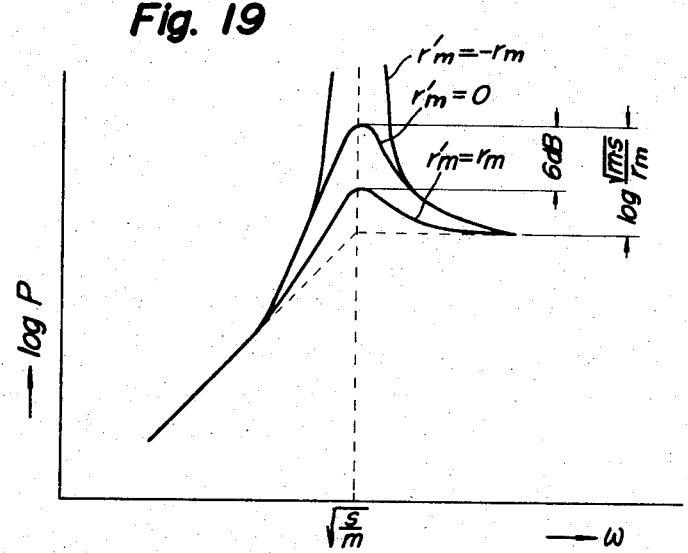
Figure 20:
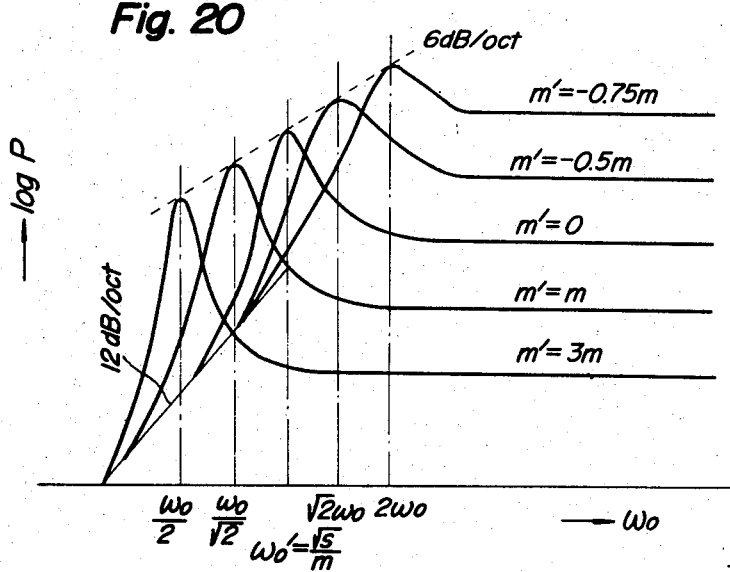

The characteristics and gain of $G_E$ are variable, and the sound pressure P on the axis is made as shown in FIG. 18, if $$G_E = \frac{S'}{j\omega}$$

as shown in FIG. 19, if $G_E K_2 = r_{m'}$ is constant; and as shown in FIG. 20, if $G_E K_2 = j\omega m'$. ($s'$, $r_{m'}$ and $m'$ are constants). Any other desirable characteristics may be obtained by making $G_E K_2 \propto \omega^2$, $\omega^3 \ldots$, or their combinations.

(ii) Case of $e_i = 0$ (electric signal input is zero).
In Equation 10, if $e_i = 0$ $$A_0 = \frac{1}{Z_m}\left(BG_D \frac{1}{1+\frac{1}{Z_M}G_E G_P G_D B} \cdot \frac{1}{Z_M} G_E G_P P_0 S - P_0 S\right)$$

$$= P_0 S \frac{1}{Z_M} \left( \frac{1+\frac{1}{Z_M}G_E G_P G_D B - \frac{1}{Z_M}G_E G_P G_D B}{1+\frac{1}{Z_M}G_E G_P G_D B} \right)$$

$$= P_0 S \frac{1}{Z_M}\left(\frac{1}{1+\frac{1}{Z_M}G_E G_P G_D B}\right) \quad (16)$$

Therefore, the apparent acoustic impedance $Z_{MA}$ of the vibrating member is $$Z_{MA} = \frac{P_0}{A_0} = \frac{1}{S}Z_M\left(1+\frac{1}{Z_M}G_E G_P G_D B\right) \quad (17)$$

The Equation 17 contains the gain $G_E$ that is variable at will, and therefore, the apparent acoustic impedance of the vibrating member may be increased or decreased by a large amount, or may be given phase change at will compared with its proper value $Z_M/S$.

In this case, the vibrating mode of this vibrating member being stable as hereinbefore mentioned, an extremely wide range of frequencies can be employed, and in addition, the construction is electrostatic, so that an extremely thin and flat system can be manufactured. When $e_i$ and $P_O$ are coexisting, it is a simple superposition of the two cases.

What we claim is:

1. An electrostatic transducer comprising an electrically conductive planar vibrating member, an electrically conductive driving electrode disposed opposite said planar vibrating member for applying a driving force thereto, means for applying a driving voltage between said planar vibrating member and said driving electrode, said driving electrode further comprising means for distributing the driving force across said planar vibrating member such that the force applied to each point of said member is proportional to the perpendicular displacement of said point from the position of zero displacement of said planar vibrating member when such perpendicular displacement occurs in single mode vibration.

2. An electrostatic transducer according to claim 1 in which said driving electrode is split into a plurality of sections, the ratio of the areas of these sections being selected to give the desired driving force distribution.

3. An electrostatic transducer according to claim 1 in which the spacing between said vibrating member and said driving electrode is selected to give the desired driving force distribution.

4. An electrostatic transducer according to claim 1 in which said driving electrode is split into a plurality of sections which are electrically insulated from each other and to which different voltages are applied so as to give the desired driving force distribution.

5. An electrostatic transducer according to claim 1 in which electrical insulators having different dielectric constants are interposed between said vibrating member and said driving electrode.

6. An electrostatic transducer according to claim 1 wherein said driving electrode is split into a plurality of sections, the ratio of the areas of these sections being selected to give the desired driving force distribution and wherein the spacing between said vibrating member and said driving electrode is selected to give the desired driving force distribution.

7. In combination with the electrostatic transducer as claimed in claim 1 and which further includes an electrical drive circuit for driving the drive electrode, an electro-mechanical-electrical feedback system comprising means for electrically detecting the vibration of the vibrating member in said transducer and feeding the detected signal back to a driving electrical circuit for thereby varying the apparent constant of said vibrating member.

8. An electrostatic transducer according to claim 1, in which an auxiliary electrode is disposed at a point of the minimum driving force distribution.

9. An electrostatic transducer according to claim 1, in which said driving electrode is suitably slotted or channelled to select the effective electrode area of said driving electrode opposite to said vibrating member for thereby giving the desired driving force distribution.

References Cited

UNITED STATES PATENTS

| | | | |
|---|---|---|---|
| 2,948,778 | 8/1960 | Clements | 179—1 |
| 2,968,695 | 1/1961 | Corliss | 179—1 |

FOREIGN PATENTS 537,931    7/1941    Great Britain.

KATHLEEN H. CLAFFY, *Primary Examiner.*

R. P. TAYLOR, *Assistant Examiner.*